United States Patent [19]

Taylor

[11] 4,197,086
[45] Apr. 8, 1980

[54] METHOD AND APPARATUS FOR AGGLOMERATING SOLID NON-COMBUSTIBLE WASTE MATERIAL

[75] Inventor: Thomas E. Taylor, Bergenfield, N.J.

[73] Assignee: Foster Wheeler Energy Corporation, Livingston, N.J.

[21] Appl. No.: 856,554

[22] Filed: Dec. 1, 1977

[51] Int. Cl.² ............................................. F27B 15/00
[52] U.S. Cl. ..................................... 432/58; 110/245; 159/DIG. 3
[58] Field of Search .......................... 432/58; 110/245; 159/DIG. 3

[56] References Cited

U.S. PATENT DOCUMENTS

| | | | |
|---|---|---|---|
| 1,577,902 | 3/1926 | Fernholtz | 44/10 G |
| 2,076,315 | 4/1937 | Albrecht | 44/10 G |
| 3,319,587 | 5/1967 | Albertson et al. | 110/245 |
| 3,397,657 | 8/1968 | Tada | 110/8 |
| 3,399,637 | 9/1968 | Hirschfield | 110/245 |
| 3,580,193 | 5/1971 | Logan et al. | 110/245 X |
| 3,625,165 | 12/1971 | Ishigaki | 110/245 X |
| 3,702,595 | 11/1972 | Muirhead et al. | 110/245 |

FOREIGN PATENT DOCUMENTS 456822 7/1968 Switzerland ............................ 110/245

Primary Examiner—John J. Camby
Attorney, Agent, or Firm—Marvin A. Naigur; John E. Wilson; John J. Herguth, Jr.

[57] ABSTRACT

A method of agglomerating solid particulate waste material includes heating and fluidizing a bed of non-combustible granular material, the temperature being lower than the melting temperature of the granular material and the fluidization being accomplished by passing a gas through the granular material. A slurry containing the material to be agglomerated is introduced into the bed. The combustible material in the slurry is partially oxidized by means of heat generated by fuel combined with material in the slurry for drying and agglomerating said material and the dried and agglomerated material is removed from the bed.

The apparatus includes a combustion chamber, a bed of non-combustible granular material in the chamber, circulating means for passing a gas through the bed, and heating means for heating and maintaining the bed at an elevated temperature. Introducing means is provided for introducing the solid particulate waste material into the bed in the form of a slurry, the waste material being dried and agglomerated through partial oxidation by means of heat generated by fuel combined with the waste material. Removal means is provided for removing the dried and agglomerated waste material from the combustion chamber.

10 Claims, 9 Drawing Figures

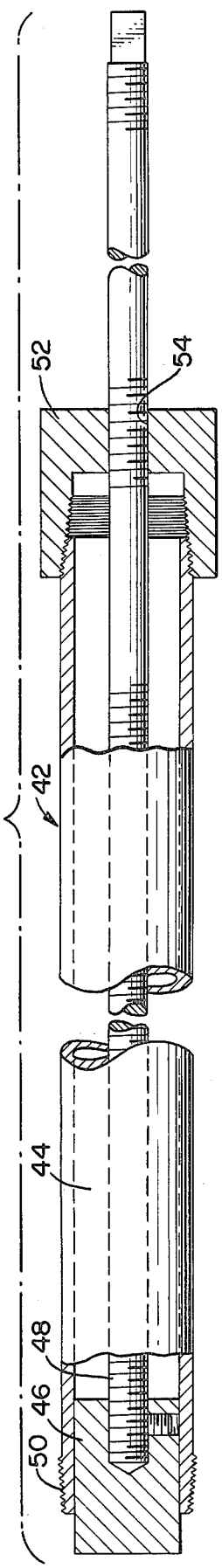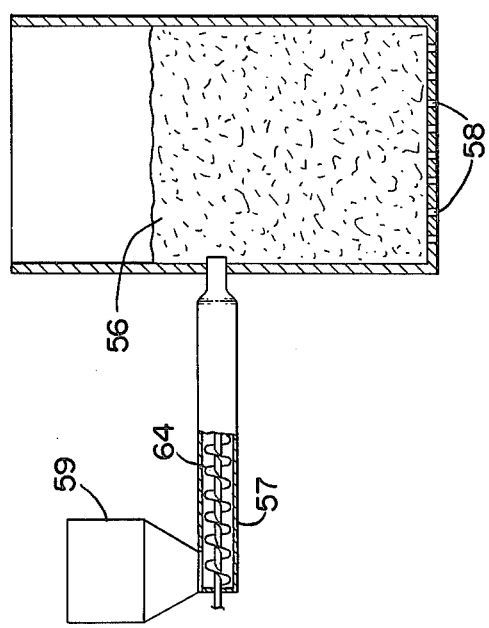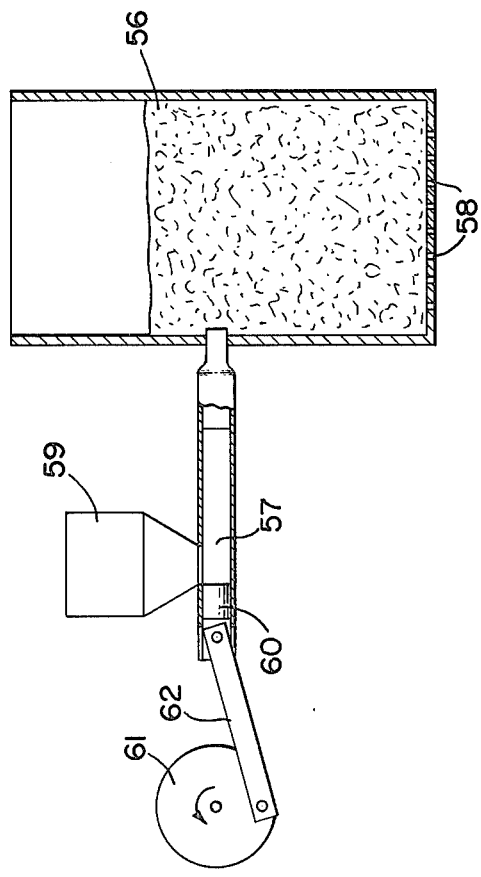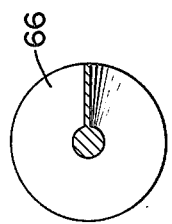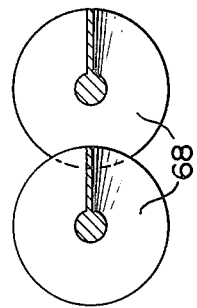
FIG. 3
FIG. 5
FIG. 5B
FIG. 4
FIG. 5A

METHOD AND APPARATUS FOR AGGLOMERATING SOLID NON-COMBUSTIBLE WASTE MATERIAL

BACKGROUND OF THE INVENTION

This invention relates to a method of transforming fine particulate waste material into a physically stable form and an apparatus for practicing the method.

One method used for cleaning coal is to crush and wash it to remove rock and other impurities. The impurities are removed in a very finely-divided wet state known as washery waste.

The standard practice for storing the washery-waste has been to stack it in large piles. However, these piles can become plastic and develop a tendency to move under their own weight, causing severe problems.

In an attempt to solve this problem, the washery-waste has been alternately layered with crushed rock from the mine. However, even though this solution has proved effective in preventing the piles from moving, layering becomes impractical as the distance increases between the dump site and mine which is the source of the crushed rock. The greater the distance, the less economical it is to carry the crushed rock to the location of the washery-waste piles.

SUMMARY OF THE INVENTION

The problems discussed above have been solved by the inventive method and apparatus which are the subject of this application and which are directed to agglomerating the washery-waste into physically stable plugs which have a relatively high compressive strength.

The method involves injecting a slurry containing the waste material into a chamber which contains a bed of solids maintained at an elevated temperature through which a gas, above the minimum fluidizing velocity of the bed is passed, e.g., fluidizing the bed. A fuel such as a combustible carbonaceous material can be introduced into the chamber as a part of the slurry. The slurry is exposed to heat in the fluidized bed, either from the combustible material itself or from an external heat source, which dries and agglomerates the washery-waste fines through partial oxidation.

The apparatus includes a combustion chamber which contains a bed of solids, means for passing a gas through the bed, means for maintaining the bed at an elevated temperature, means for introducing a slurry into the bed, and means for removing an agglomerate formed through partial oxidation in the bed of the material in the slurry.

The means for introducing the slurry into the bed can be a batch feeder utilizing a rod and piston or a continuous screw feed mechanism. The means for removing the agglomerate can utilize a bed-screening system to make the operation continuous, whereby the agglomerated waste material is randomly removed through an opening located either at the top or bottom of the combustion chamber and passed over a screen to remove undersized particulate matter which is recirculated back into the chamber. The oversized matter which remains on the screen is the agglomerated waste which is removed as the product.

It has also been found that the inventive method can be used as an alternative to a carbon burn-up cell in a fluidized-bed, coal-fired steam generator where carbon carryover in flue gas, which includes unburned coal and bed material, is separated from the gas and burned in a separate burn-up cell at a temperature higher than that in the main cells. By using the inventive method the separate cell can be eliminated by forming a slurry of the carbon carryover and introducing the slurry into the main cells of the generator in order to agglomerate the carryover and thus provide sufficient residence time for burnout.

BRIEF DESCRIPTION OF THE DRAWINGS

For a better understanding of the invention, reference may be had to the following description of several preferred embodiments of the invention taken in conjunction with the accompanying drawings, in which:

FIG. 3 is a front plan view, partially in section, of an extrusion tube and piston used for introducing slurry into the combustion chamber of FIGS. 1 and 2;

FIG. 4 is a schematic representation of a non-continuous piston and crank mechanism for introducing slurry into a combustion chamber;

FIG. 5 is a schematic representation of a continuous screw feed mechanism for introducing slurry into a combustion chamber;

FIGS. 5a and 5b are front plan views of single and double screws which can be used in the mechanism shown in FIG. 5;

DETAILED DESCRIPTION OF PREFERRED EMBODIMENTS

Figure 1:
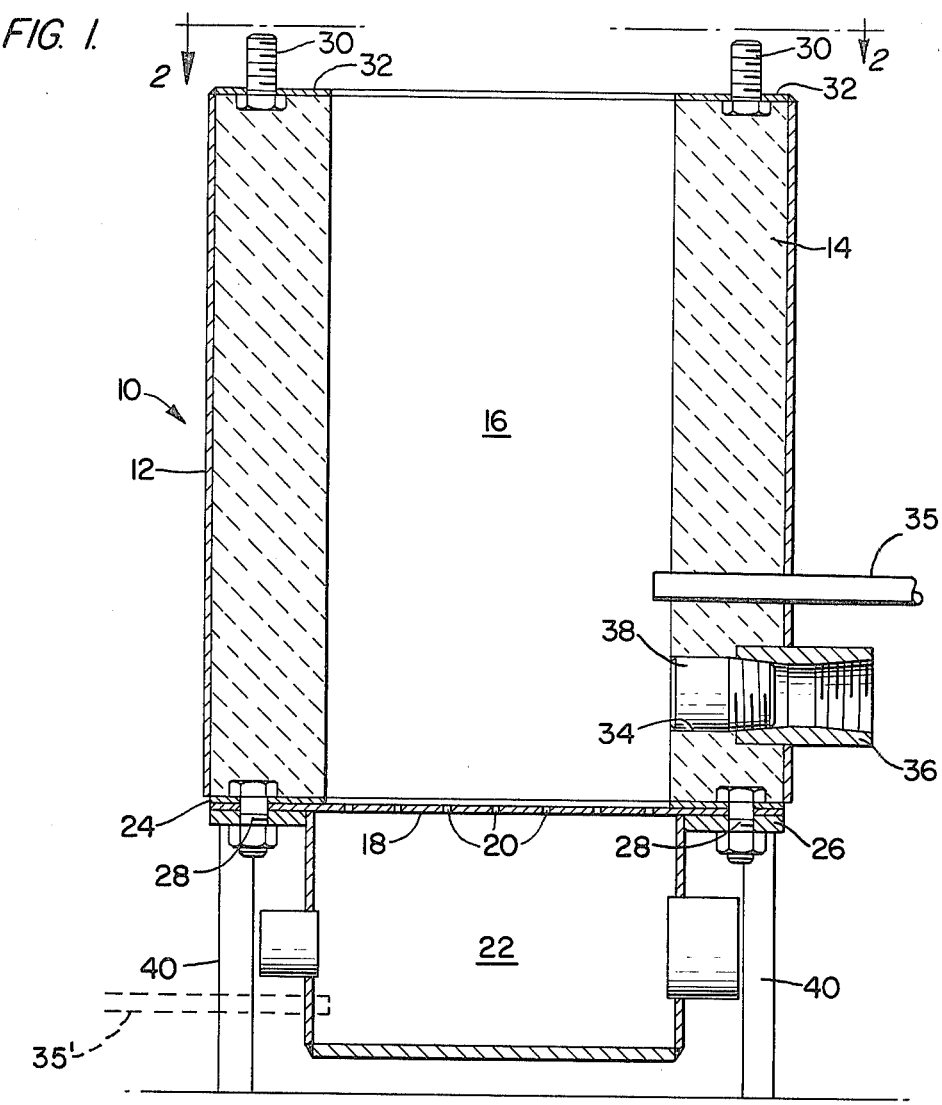
FIG. 1 is a front sectional view of a combustion chamber in which the inventive method can be practiced.

In describing the invention in detail, the method will first be described and then a test apparatus in which the inventive method can be practiced will be described in conjunction with FIGS. 1-3. Alternative embodiments of different portions of the inventive apparatus for commercial operation will then be described in conjunction with FIGS. 4-7.

The method involves extruding or otherwise introducing a slurry of particulate matter into a fluidized bed combustion chamber. When the method is used to agglomerate coal washery-waste the slurry will contain fine particles of coal as well as the separated impurities. The coal fines in the waste can provide the heat necessary to dry and agglomerate the waste material through partial oxidation inside the fluidized bed. It is believed, however, that all of the heat necessary for agglomeration need not be provided by a fuel in the slurry, but additional heat can be provided from an external source such as, for example, from a hydrocarbon or fossil fuel introduced through one or more nozzles projecting into or above the bed in the vicinity of the slurry.

The slurry should contain enough water or other fluid to allow agglomeration to take place, and would normally be conditioned enough by allowing excess fluid to drain off before the slurry is introduced into the combustion chamber. The fluid content should preferably be kept at a minimum since, if too much heat is expended to dry the slurry, the required temperature of the fluidized bed cannot be maintained. In the final analysis, the optimum solids content of the slurry will be a function of the heating value of the combustible material in the slurry (and/or of heat applied from an external source).

The slurry can be introduced into the combustion chamber by any suitable means, several of which are discussed in detail below.

The fluidized bed into which the slurry is introduced is composed of non-combustible solids such as sand, crushed refractory or limestone. The bed can be formed of limestone, for example, to control $SO_2$ emissions when high sulfur coal is used in the slurry. The size of the bed material is a function of the velocity of the gas passed through the bed.

By using a fluidized bed, gas can be circulated at superficial velocities much greater than the terminal velocities of the particles to be agglomerated, resulting in lower equipment costs since the plan area of the bed is inversely proportional to the superficial gas velocity.

The temperature of the fluidized bed is a function of the combustion efficiency of the combustible material in the slurry. Obviously, the temperature must be below the fusion temperature of the bed material. In some cases the temperature must be above the temperature at which a desired reaction takes place such as, for example, when limestone is used as a bed material to control $SO_2$ emissions. In that case the bed temperature should be above 1600° F. although optimum sulfur capture occurs at 1550° F.

When the slurry is introduced into the fluidized bed, heat produced by the combustible material in the slurry (and/or supplied from an external source) will dry and agglomerate the waste material through partial oxidation. In this way the waste fines are transformed into a physically stable mass which has been found to have a significantly greater compressive strength than if the waste material were merely dried.

After agglomeration takes place the agglomerate can be removed from the combustion chamber by suitable means, several of which are described in detail below.

Figure 2:
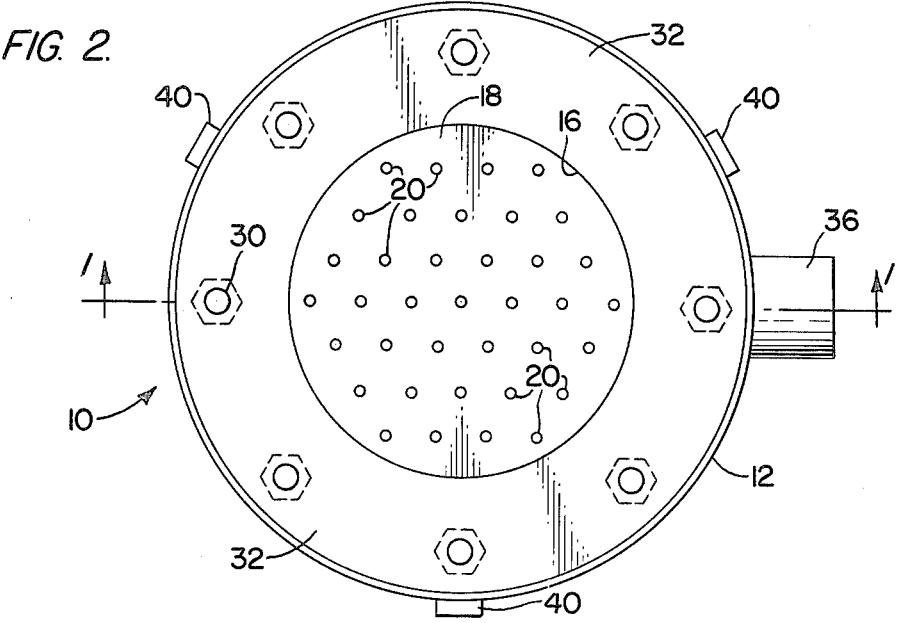
FIG. 2 is a top plan view of the combustion chamber of FIG. 1 looking along the line 2—2 as shown in Fig. 1.

FIGS. 1, 2, and 3 show a test apparatus which was used to practice the invention.

In FIGS. 1 and 2, reference number 10 is used generally to identify a combustion chamber which includes an outer wall 12 and an inner refractory liner 14, the inner surface of which defines the vertical walls of a chamber 16. The outer wall 12 is about 12 in. high and has a 10 in. inner diameter and the refractory liner 14 has about a 6 in. inner diameter.

The bottom of the chamber 16 is defined by a gas distribution plate 18 which is formed with a plurality of openings 20 arranged as shown in FIG. 2 so that air or other gas can be passed upwardly through the bed of material located in the chamber 16. A plenum 22 guiding the gas through the openings 20 is connected at the bottom of the chamber 16 between an annular bottom plate 24 and a gasket 26 by means of bolts 28.

The top of the chamber 16 is open to allow the gas passed through the fluidized bed to escape. As shown in FIG. 1, a plurality of bolts 30 are welded to an annular upper plate 32 so that an exhaust duct (not shown) can be attached to the combustion chamber 10.

The vertical wall of the combustion chamber 10 includes an opening 34 through which the slurry can be extruded into the fluidized bed in the chamber 16. The opening 34 is formed of a coupling 36 which is threaded on its inner surface at the outer end for receiving a sludge injector which will be described later. The opening 34 also includes a pipe 38 which connects the coupling 36 with the chamber 16. Three legs 40 are spaced apart around the combustion chamber 10 and welded to the outer surface of the outer wall 12.

A nozzle 35 extends through the vertical wall of the chamber 10 and is used to introduce fuel into the chamber to effect heating of the bed material on a as-required-basis. In an alternate arrangement, a nozzle 35' (broken-line illustration) may be used to introduce the fuel into the plenum to heat the fluidizing gas before it is circulated through the bed material.

The slurry was extruded into the chamber 16 by the injector shown in FIG. 3 and generally designated by reference numeral 42. The injector 42 includes a tube 44 in which a piston 46 connected to a rod 48 can move. The tube 44 also includes a tapered threaded end 50 which is adapted to screw into the coupling 36. A cap 52 is threaded onto the other end of the tube 44 and contains an opening 54 through which the rod 48 can move. The tube 44 is about 19 in. long and the outer diameter of the piston 46 is about 1.04 in.

The injector 42 can be filled with slurry prior to its being coupled to the combustion chamber 10 by retracting the piston 46 to the right side of the injector in FIG. 3 and introducing the slurry through the left side, or slurry can be introduced after coupling by removing the cap 52 and the piston 46.

During the tests, the results of which are shown below, a bed formed of $-6+50$ mesh sand was provided in the chamber 16 and heated to 1750° F. by firing liquid propane (LP) gas at a superficial velocity of two feet per second. As soon as the temperature reached a constant level, a slurry of washery waste fines was introduced into the bed by means of the injector. As soon as the slurry was introduced into the bed, a 50° F. temperature drop was observed which was attributed to heat losses associated with heating the sludge and driving off the moisture. After about 10 minutes of operation the bed was slumped and cooled and the sludge plugs removed for examination.

A portion of the carbon in the slurry had been burned and the sludge had agglomerated into a physically stable plug which exhibited much greater compressive strength than that of the original sludge or air-dried sludge.

The chemical analyses of the slurry and the agglomerated plug are as follows:

| A. Slurry | | |
|---|---|---|
| Proximate Analysis | As Rec'd | Dry |
| Fixed Carbon | 18.77 | 26.33 |
| Volatiles | 13.92 | 19.53 |
| Ash | 38.59 | 54.14 |
| Moisture | 28.72 | — |
| TOTALS | 100.00 | 100.00 |
| Ultimate Analysis | As Rec'd | Dry |
| C | 23.96 | 33.96 |
| H | 1.74 | 2.47 |
| O | 6.43 | 8.11 |

| -continued | | |
|---|---|---|
| N | 0.27 | 0.37 |
| S | 0.29 | 0.40 |
| Ash | 38.59 | 54.69 |
| Moisture | 28.72 | — |
| TOTALS | 100.00 | 100.00 |
| High Heat Value | As Rec'd 4,253 | |
| Btu/lb | Dry 6,028 | |

B. X-Ray Diffraction Analysis of Agglomerate

| $SiO_2$ | Major |
|---|---|
| $Fe_2O_3$ | Minor |
| Carbon | Minor as graphite |

Other tests were performed on the above slurry with the bed heated to 1660° F. and 1850° F. and similar results were noted. Several of the agglomerated plugs were placed in water for a period of two weeks and no discernible change in physical properties was found after the plugs were removed.

The apparatus of the present invention is shown in FIGS. 4-7 where alternative embodiments for commercially practicing the invention are shown. FIGS. 4 and 5 show two mechanisms which can be used for introducing the slurry into a combustion chamber 56.

In FIG. 4, an extrusion tube 57 is connected to the combustion chamber 56 which includes openings 58 in the bottom for the introduction of fluid by suitable means and contains a fluidized bed as discussed above. The washery waste fines are introduced through a hopper 59 into the extrusion tube 57 in the path of a piston 60 which is moved back and forth by means of a crank 61 and rod 62 in a conventional manner.

Alternatively, as shown in FIGS. 5, 5a, and 5b, a continuous feeding apparatus can be provided where instead of utilizing the rod and piston arrangement of FIG. 4, a screw feeding mechanism 64 can be utilized inside of the extrusion tube 57. As shown in FIGS. 5a and 5b, respectively, a single screw 66 or double screws 68 can be used.

As mentioned above, excess water can and should be removed from the slurry before it is introduced into the combustion chamber. This can be done, for example, by providing a screen along the bottom of the extrusion tubes shown in FIGS. 4 and 5 or by providing screws of decreasing pitch in addition to the screen section in the embodiments shown in FIGS. 5, 5a, and 5b.

Figure 6:
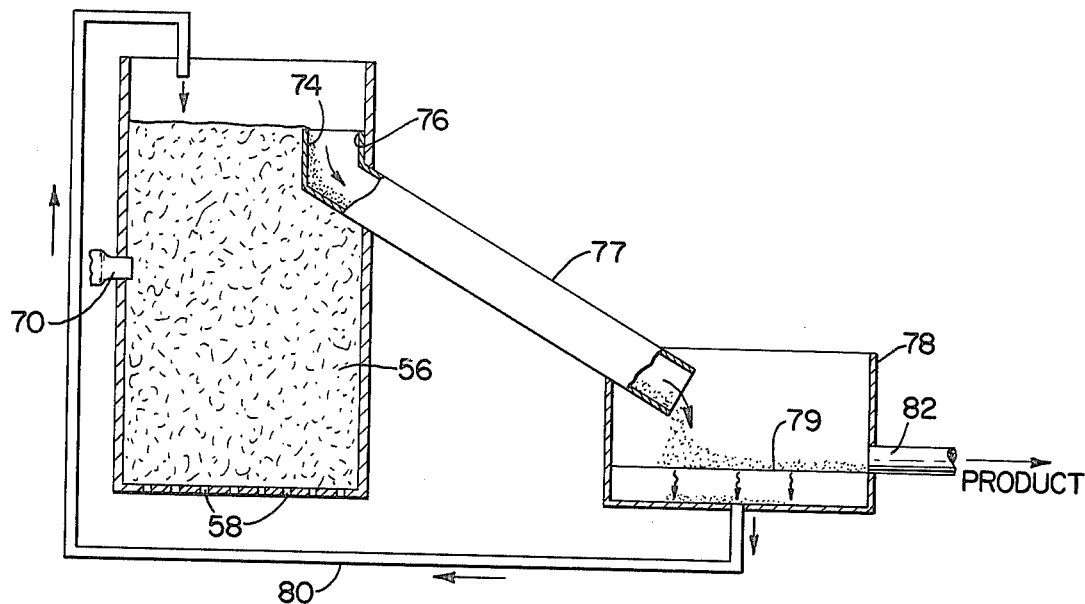
FIG. 6 is a schematic representation of an apparatus adapted for continuously practicing the inventive method which includes a bed screening system and a weir gate located at the top of a combustion chamber.
Figure 7:
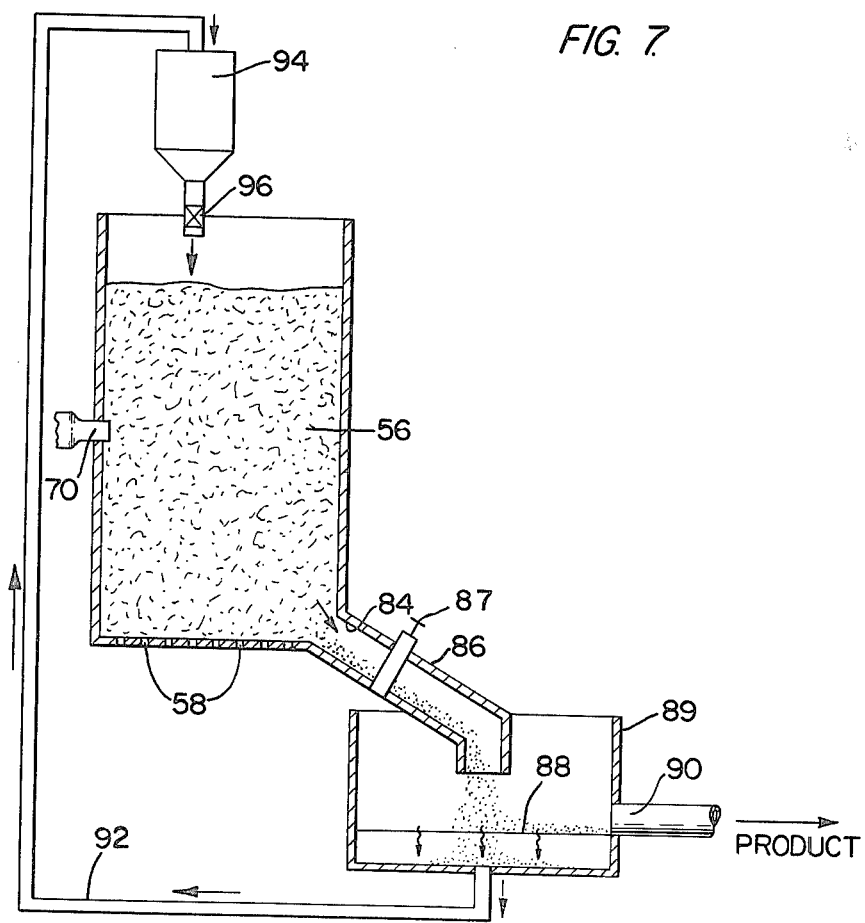
FIG. 7 is a schematic representation of another embodiment of an apparatus for continuously practicing the inventive method which includes a bed screening system and an opening located at the bottom of a combustion chamber.

Removal of the agglomerate can be continuous by utilization of the apparatuses shown in FIGS. 6 and 7. In FIG. 6, the slurry is introduced through an opening 70 into the combustion chamber 56 which includes the openings 58 and fluidized bed as discussed above. During the process the agglomerated material will tend to migrate upwardly through the fluidized bed along with some bed material, and will fall over a weir gate 74 and through an opening 76 located at the top of the combustion chamber 72. The opening 76 is defined by the upper end of a conduit 77 which extends through an opening in the wall of the combustion chamber 56. A trough 78 is located at the lower end of the conduit 77 for receiving the overflow agglomerate and bed material. A screen 79 is provided in the trough 78 to separate the bed material so it can be returned to the bed through a conduit 80. The oversized agglomerate will remain on the screen 79 and can be removed by any suitable means as product through an opening 82. It has been found that the product size is a function of the size of the injector and the time the material is exposed to heat.

In FIG. 7, an exit opening 84 is provided at the bottom of the chamber 56, where the agglomerate and some bed material is removed and passed through a conduit 86, which includes a flow control valve 87, over a screen 88 disposed in a trough 89. As described above in connection with FIG. 6, the agglomerated waste is removed as product through a discharge conduit 90, while the undersized bed fines pass through the screen 88 and are circulated to the bed through a conduit 92. In this embodiment a storage bin 94 with a shut off valve 96 is provided for selectively returning the bed material to the combustion chamber 86.

As mentioned above, the inventive method can also be used to dispose of carbon carryover in flue gas from a combustion chamber of a coal-fired fluidized bed steam generator and eliminate the need for a separate carbon burn-up cell. The fines in the flue gas are separated and sent to a hopper where water is added to form a slurry. The slurry is introduced into the combustion chamber, as described above, where the carryover is agglomerated in the fluidized bed of the combustion chamber, thereby permitting burn-out because of the increased residence time of the agglomerated particles.

Thus, there is provided in accordance with the invention a method and apparatus effective in transforming a slurry of waste into a solid physically stable form by introducing the slurry into a fluidized bed operating at an elevated temperature so that the waste material in the slurry will be dried and solidified into an agglomerated plug. This is done by means of heat provided by carbonaceous material or other fuel in the slurry or from an external source. The product thus formed solves the problems of storing the waste material by providing a mass which has a compressive strength significantly greater than can be obtained by merely drying the waste material.

It should be understood that those skilled in the art will be able to make variations and modifications to the invention without departing from the spirit and scope of the appended claims and that all such variations and modifications are contemplated as falling within the scope of the claims.

What is claimed is:
1. An apparatus for agglomerating particulate washery-waste fines obtained from the cleaning of crushed coal into physically stable plugs comprising:
    a chamber in which agglomeration is effected;
    a bed of non-combustible granular material in said chamber;
    fluidizing means for passing a fluidizing gas through said bed to effect fluidization thereof;
    an introducing means for introducing particulate washery-waste material into said bed in the form of a slurry;
    heating means for heating and maintaining said bed at an elevated temperature sufficient to dry, partially oxidize, and agglomerate said washery-waste material into physically stable agglomerates, said temperature being below the fusion point of said bed material; and
    means for removing a mixture of the agglomerates and granular material from said chamber, for screening the agglomerates from the granular material, and for returning the granular material to said chamber.

2. The apparatus in claim 1, wherein the passing means includes a plenum connected at the bottom of the chamber, the plenum and chamber being separated by plate with a plurality of openings to enable gas to pass upwardly through the bed.

3. The apparatus in claim 1, wherein the introducing means includes a tube, a piston movable between retracted and forward positions in the tube, means for introducing a charge of waste material in the path of the piston in the retracted position and means for moving the piston back and forth between the retracted and forward positions.

4. The apparatus in claim 1, wherein the introducing means includes a tube, screw conveyor means in the tube for continuously conveying material into the chamber, means for continuously introducing waste material onto the screw conveyor means.

5. The apparatus in claim 4, wherein the screw conveyor means includes a single screw.

6. The apparatus in claim 4, wherein the screw conveyor means includes two screws cooperating together.

7. The apparatus in claim 1, wherein the removal means includes a weir gate at the top of the bed over which agglomerated waste material can fall by gravity, a screen for separating bed material and agglomerated material, and means for returning separated bed material to the chamber.

8. The apparatus in claim 1, wherein the removal means includes an opening at the bottom of the chamber through which agglomerated waste material can fall by gravity, a valve for flow control, a screen for separating bed material and agglomerated material, and means for returning separated bed material to the chamber.

9. The apparatus claimed in claim 1 wherein:
said heating means is adapted to maintain the temperature of said chamber above 1600° F.

10. The apparatus claimed in claim 9 wherein:
said heating means is adapted to maintain the temperature in said chamber substantially between 1600° F. and 1850° F.

* * * * *